Patented Oct. 26, 1937

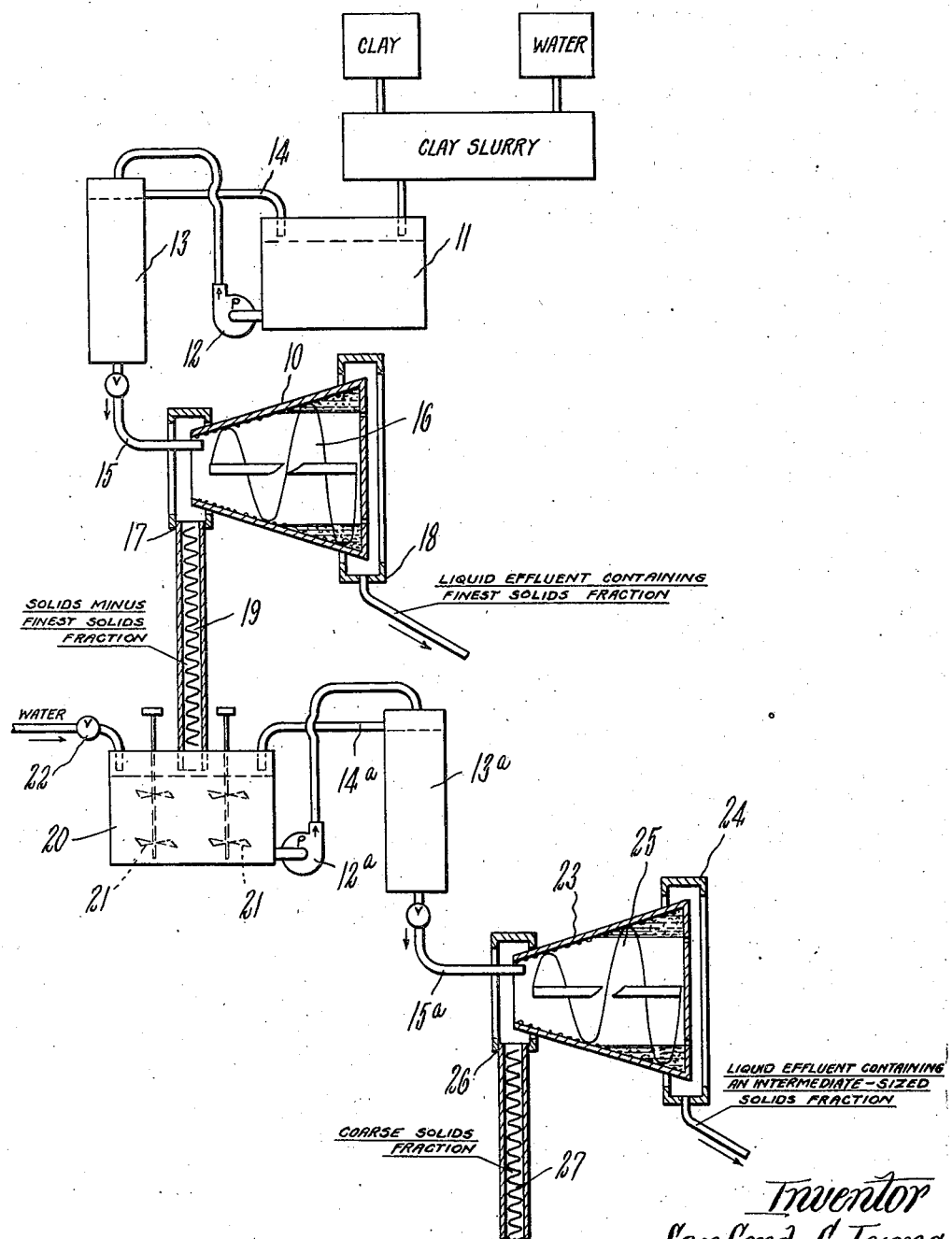

2,097,420

UNITED STATES PATENT OFFICE 2,097,420

CENTRIFUGAL FRACTIONATION OF FINELY DIVIDED SOLIDS INTO SUBSTANTIALLY UNIFORM SOLIDS FRACTIONS OF VARYING AVERAGE PARTICLE SIZE

Sanford C. Lyons, Bennington, Vt., assignor to Bird Machine Co., Walpole, Mass., a corporation of Massachusetts Application June 26, 1937, Serial No. 150,606

2 Claims. (Cl. 233—18)

This invention relates to a centrifugal fractionation of finely divided solids into substantially uniform solids fractions of varying average particle size. It deals more especially with a method of centrifugal fractionation constituting a specie of the method disclosed and covered generically in my application Serial No. 89,886, filed July 10, 1936, now Patent No. 2,085,538, dated June 29, 1937; and the instant application, which is a continuation-in-part of that application, is centered about the specie of method described in that application as involving the operation of successive fractionating or centrifugating stages at progressively decreasing intensity of solids-depositing conditions.

In accordance with the specific method hereof, a liquid suspension of finely divided solids made up of particles of various sizes is resolved into separate substantially uniform solids fractions of different particle size by the use of a succession of two or more rotary centrifuges on whose internal walls the solids may be centrifugally deposited and by the operation of the successive centrifuges at progressively decreasing intensity of solids-depositing conditions as the solids deposited in one centrifugating stage are being removed therefrom and put into liquid suspension prior to their introduction into the next centrifugating stage. As fully pointed out in my application Serial No. 89,886, the solids-depositing conditions in each centrifugating stage must be maintained substantially constant; and, to this end, the rate of rotation of each centrifuge and the rate of flow of suspension in each centrifugating stage of the method hereof is maintained substantially constant and, while centrifugation is occurring in each stage of the method hereof, the solids are progressively removed from the wall of each centrifuge and liquid effluent is separately removed from the sphere of action in each centrifugating stage so as to maintain the effective centrifugating force substantially constant in each stage. The method hereof further involves performing the first stage of centrifugation under solids-depositing conditions of such intensity as to remove from suspension all but the finest solids fraction and a succeeding stage of centrifugation under solids-depositing conditions of such lower intensity as to remove from suspension all but the next finest solids fraction. It is thus possible by the method hereof to produce a liquid effluent from the sphere of action of each centrifugating stage containing suspended therein a substantially uniform solids fraction but of progressively increasing particle size coarseness in the successive separate liquid effluents from the successive centrifugating stages.

With the foregoing and other features and objects in view, the invention hereof will now be described in further detail with particular reference to the accompanying drawing, which depicts diagrammatically and conventionally a succession of centrifuges and auxiliary equipment appropriate for the practice of the method hereof.

It appears unnecessary to illustrate or describe in detail the construction of the continuous-flow type of centrifuge used for performing the method hereof. Suffice it to say that such centrifuge and its mode of operation are adequately described in my application Serial No. 89,886 and that the disclosure of that application should be considered, so far as it is harmonious herewith, as being applicable hereto, including those portions of that disclosure emphasizing the importance of maintaining the solids-depositing conditions, especially the rate of flow of suspension, substantially constant in each centrifugating stage.

While not limited thereto, the drawing is legended to show the centrifugal fractionating method hereof as being applied to clay which, as is well-known, is made up of fine particles of widely variant sizes, ranging, for example, all the way from particles that exhibit the Brownian movement, that is, from colloidal particle size, to particles that are visible to the naked eye and tend to settle out differentially when clay in aqueous suspension is permitted to stand in quiescent condition. The clay to be subjected to the method hereof may contain such coarse or oversized impurities as sand, mica, or the like; or it may previously have been largely or substantially completely freed from such impurities by having been passed in the form of an aqueous suspension through such conventional devices as sluices, classifiers, screens, or the like.

As illustrated in the drawing, clay is admixed with water to form a substantially uniform slurry or aqueous clay suspension of the desired solids content; or the clay slurry may be that coming from a sluice or its equivalent wherein coarse impurities have been selectively settled or removed. The clay slurry may be delivered by way of suitable instrumentalities for regulating rate of flow or feed into the first-stage centrifuge 10. The flow-regulating instrumentalities shown in the drawing include a storage tank 11 into which the slurry is delivered and from which the slurry is circulated by a pump 12 into a constant-level tank 13 at a rate such that suspension constantly flows from the tank 13 through a pipe 14 back to the tank 11. The slurry thus maintained at constant liquid head in the tank 13 is fed at substantially uniform rate by way of a valved pipe 15 into the centrifuge 10 near its small-diameter or intake end. The centrifuge 10 is operated under substantially uniform solids-depositing conditions of such intensity that the solids, excepting the clay fraction consisting of the finest or colloidal particles, are deposited from suspension on the wall of the centrifuge. The thus-deposited solids may be progressively removed from the wall of the centrifuge by a helicoidal blade 16 and discharged from the small-diameter end of the centrifuge into a trough 17, whereas the aqueous suspending vehicle or effluent containing suspended therein the finest or colloidal clay particles may be received from the large-diameter end of the centrifuge by a trough 18. The liquid effluent containing suspended therein the finest or colloidal clay fraction may be withdrawn from the trough 18 and treated in any suitable way for the recovery of such fraction. Thus, such liquid effluent may be treated with a suitable clay-flocculating agent, such as alum, and the flocculated clay then recovered in filter presses or the like; or, if desired, the fine or colloidal clay fraction may be recovered from suspension by passing such liquid effluent through an electrophoretic centrifuge of the type described in my Patent No. 2,057,156, dated October 13, 1936, which type of centrifuge is designed especially for the purpose of causing subsidence or removal of extremely fine or colloidal particles from suspension.

The solids that are minus the finest clay fraction and that are discharged into the trough 17 may be progressively taken from such trough through a positive-feed sluice or conduit 19 to a mixing tank 20 equipped with agitators 21 and supplied with water from a valved pipe 22. Such solids may thus be re-suspended in water in the tank 20 to produce a substantially uniform slurry or aqueous suspension, which may be fed at the desired substantially uniform rate by way of flow-regulating instrumentalities 12a, 13a, 14a, and 15a, similar to those in advance of the first centrifuge 10, into the intake or small-diameter end of a second centrifuge 23 operated under substantially uniform solids-depositing conditions of such lower intensity than those maintained in the centrifuge 10 as to result in the emergence from the large-diameter end of such centrifuge 23 of a liquid suspension or effluent containing only an intermediate-sized solids or clay fraction. Such liquid effluent may be received by a trough 24 and be delivered therefrom to filter presses or other suitable apparatus for recovering the intermediate-sized solids fraction from suspension. Indeed, such liquid effluent may be passed into a centrifuge operated under conditions to ensure a substantially complete separation or subsidence of its solids content.

The coarse solids fraction deposited on the wall of the centrifuge 23 and progressively removed from such wall and discharged through the small-diameter end of such centrifuge by a helicoidal blade 25 may be received in a trough 26 and thence delivered through a positive-feed sluice 27 to the desired destination. The coarse solids fraction may, for instance, be used as such for making bricks or ceramic ware; or, if it has an undesirable content of coarse impurities, such as sand and mica for its intended use, it may be resuspended in water and the coarse impurities separated from suspension, as by subjecting the suspension to a selective settling or centrifuging treatment.

It is thus seen that the method hereof enables the resolution of clay into substantially uniform solids fractions of different particle size. The finest clay fraction produced by the method hereof may, for example, be made up of particles of a size finer than about 2 microns. The intermediate-sized clay fraction may consist essentially of particles ranging from, say, about 2 to 10 microns. The coarse solids fraction may contain substantially all the coarser particles, that is, particles of a size greater than about 10 microns. These several fractions are adapted to fulfill particular spheres of use, as indicated in some detail in my application Serial No. 89,886. It is to be understood, however, that the method hereof enables the realization from clay of substantially uniform solids fractions of other particle sizes or particle size ranges. As additionally indicated in my application Serial No. 89,886, the method hereof is applicable to the centrifugal fractionation of various materials, other than clay, consisting of finely divided particles of widely varying sizes, for instance, to the centrifugal fractionation of pigments or fillers, such as titanium dioxide, zinc sulphide, lithopone, barium sulphate, calcium carbonate, etc., in connection with all of which it is frequently desirable that particle size, attendant tinctorial value, oil absorption, and other physical and chemical qualities be subject to control as in the case of clay.

I claim:

1. A method of resolving a liquid suspension of finely divided solids made up of particles of various sizes into separate liquid suspensions of substantially uniform solids fractions of different particle size by the use of a succession of at least two rotary centrifuges on whose internal walls such solids may be centrifugally deposited, which comprises introducing such suspension into the first centrifuge and operating the successive centrifuges at progressively decreasing intensity of solids-depositing conditions as the solids deposited in one centrifugating stage are being removed therefrom and put into liquid suspension prior to their introduction into the next centrifugating stage, maintaining the solids-depositing conditions, including the rate of rotation of each centrifuge and the rate of flow of suspension, substantially constant in each centrifugating stage, progressively removing during centrifugation the solids from the internal wall of each centrifuge and separately removing liquid effluent from the sphere of action in each centrifugating stage so as to maintain the effective centrifugating force substantially constant in each stage, and performing the first stage of centrifugation under solids-depositing conditions of such intensity as to remove from suspension all but the finest solids fraction and a succeeding stage of centrifugation under solids-depositing conditions of such intensity as to remove from suspension all but the next finest solids fraction, thereby producing a liquid effluent from the sphere of action of each centrifugating stage containing suspended therein a substantially uniform solids fraction but of progressively increasing particle size coarseness in the successive separate liquid effluents from the successive centrifugating stages.

2. A method of dissolving an aqueous suspension of clay into separate liquid suspensions of substantially uniform solids fractions of different particle size by the use of a succession of at least two rotary centrifuges on whose internal wall such solids may be centrifugally deposited, which comprises introducing such aqueous suspension into the first centrifuge and operating the successive centrifuges at progressively decreasing intensity of solids-depositing conditions as the solids deposited in one centrifugating stage are being removed therefrom and put into aqueous suspension prior to their introduction into the next centrifugating stage, maintaining the solids-depositing conditions, including the rate of rotation of each centrifuge and the rate of flow of suspension, substantially constant in each centrifugating stage, progressively removing during centrifugation the solids from the internal wall of each centrifuge and separately removing liquid effluent from the sphere of action in each centrifugating stage so as to maintain the effective centrifugating force substantially constant in each stage, and performing the first stage of centrifugation under solids-depositing conditions of such intensity as to remove from suspension all but the finest clay fraction and the last stage of centrifugation under solids-depositing conditions of such lower intensity as to remove from suspension the coarsest solids fraction, including such sand, mica, and other over-sized impurities as may be present in the clay, thereby producing a liquid effluent from the sphere of action of each centrifugating stage containing suspended therein a substantially uniform solids fraction but of progressively increasing particle size coarseness in the successive separate liquid effluents from the successive centrifugating stages.

SANFORD C. LYONS.